(12) United States Patent
Aboumrad

(10) Patent No.: US 9,836,817 B2
(45) Date of Patent: Dec. 5, 2017

(54) SYNCHRONIZED ZOOMING ACROSS MULTIPLE PLOTS

(71) Applicant: General Electric Company, Schenectady, NY (US)

(72) Inventor: Nicholas Ryan Aboumrad, Reno, NV (US)

(73) Assignee: General Electric Company, Schenectady, NY (US)

( * ) Notice: Subject to any disclaimer, the term of this patent is extended or adjusted under 35 U.S.C. 154(b) by 374 days.

(21) Appl. No.: 14/297,277

(22) Filed: Jun. 5, 2014

(65) Prior Publication Data

US 2015/0356705 A1 Dec. 10, 2015

(51) Int. Cl.
*G06T 11/20* (2006.01)
*G06F 3/0484* (2013.01)
*G06T 3/40* (2006.01)

(52) U.S. Cl.
CPC .............. *G06T 3/40* (2013.01); *G06F 3/0484* (2013.01); *G06T 11/206* (2013.01); *G06F 2203/04806* (2013.01)

(58) Field of Classification Search
CPC ......... G06F 2203/04806; G06F 3/0481; G06F 3/0484; G05B 23/0216
USPC ........................................ 345/440, 660, 661
See application file for complete search history.

(56) References Cited

U.S. PATENT DOCUMENTS

| | | |
|---|---|---|
| 6,356,256 B1 | 3/2002 | Leftwich |
| 6,847,382 B2 | 1/2005 | Chong et al. |
| 2003/0142117 A1 | 7/2003 | Chong et al. |
| 2009/0147026 A1 | 6/2009 | Buck et al. |
| 2010/0017740 A1 | 1/2010 | Gonzalez et al. |
| 2010/0214296 A1* | 8/2010 | Kawamura ........ G06K 9/00496 345/440 |
| 2010/0238174 A1* | 9/2010 | Haub ................... G06F 3/04812 345/440 |
| 2011/0007097 A1 | 1/2011 | Williams |

(Continued)

FOREIGN PATENT DOCUMENTS

| | | |
|---|---|---|
| EP | 2300917 A2 | 3/2011 |
| WO | 2010008710 A2 | 1/2010 |

OTHER PUBLICATIONS

International Search Report and Written Opinion issued in connection with corresponding PCT Application No. PCT/US2015/030471 dated Sep. 17, 2015.

*Primary Examiner* — Zhengxi Liu
*Assistant Examiner* — Scott E Sonners
(74) *Attorney, Agent, or Firm* — Fletcher Yoder, P.C.

(57) ABSTRACT

Systems and methods include manipulating multiple data plots. The multiple data plots each have horizontal and vertical dimensions and include active and inactive zoom plots. After determining whether the inactive zoom plot is to be synchronized with the active zoom plot in the horizontal or vertical dimension when zooming the active zoom plot and an indication that the active zoom plot is to be zoomed to an active zoom area, an active area zoom is performed based on the indication using a zoom start point and a zoom end point in the horizontal or vertical dimension. A corresponding inactive zoom plot is zoomed by rescaled in the horizontal or vertical dimension by converting the zoom start and end points to corresponding inactive zoom start and end points in the inactive zoom plot using a preset transfer function if the inactive zoom plot is to be synchronized.

18 Claims, 10 Drawing Sheets

(56) References Cited

U.S. PATENT DOCUMENTS

| | | | | |
|---|---|---|---|---|
| 2012/0026194 A1* | 2/2012 | Wagner | ............... | G06F 3/0485 345/647 |
| 2013/0222420 A1* | 8/2013 | Shanka | ............... | G06F 3/0484 345/629 |
| 2015/0339868 A1* | 11/2015 | Okuda | ............... | G01D 7/04 701/29.1 |

* cited by examiner

SYNCHRONIZED ZOOMING ACROSS MULTIPLE PLOTS

BACKGROUND OF THE INVENTION

The subject matter disclosed herein relates to condition monitoring systems, and more specifically, to synchronized zooming capabilities for HMI systems of condition monitoring systems, such as condition monitoring systems for industrial process control systems.

Industrial facilities, such as power generation plants, may include various interrelated equipment and process field devices. For example, power generation plants may include monitoring the condition of systems, such as pumps, reciprocating compressors, turbines, generators, and/or other systems that are desired to be monitored and the processes for monitoring such systems. In some embodiments, the power generation plants may also include operating and maintaining the turbine or generator systems. Certain industrial control systems may include a human-machine interface (HMI) system, in which graphical content associated with the equipment and process field devices of the industrial facility may be displayed. However, the graphical content may be displayed and examined individually without displaying graphical content of multiple plots in a coherent manner.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a processor configured to cause a display to display a graphical visualization with multiple data plots. Moreover, the multiple data plots each have multiple dimensions. The multiple data plots include an active zoom plot and an inactive zoom plot. The processor is also configured to determine that the inactive zoom plot is to be synchronized with the active zoom plot in at least one dimension of the multiple dimensions when zooming the active zoom plot. The processor is also configured to receive an indication that the active zoom plot is to be zoomed. Moreover, the indication includes a zoom start point and a zoom end point in the at least one dimension. The processor is also configured to zoom the active zoom plot based at least in part on the indication. Furthermore, if the inactive zoom plot is to be synchronized, the processor is configured to automatically zoom the inactive zoom plot by rescaling the at least one dimension by converting the zoom start and zoom end points to corresponding inactive zoom start and zoom end points in the inactive zoom plot using a preset transfer function.

In a second embodiment, a method includes determining that at least one inactive zoom plot is to be synchronized with an active zoom plot when the active zoom plot is to be zoomed. The synchronization may be in a horizontal or vertical dimension of the at least one inactive plot and the active zoom plot. The method also includes receiving an indication of a zoom area of the active zoom plot comprising a zoom start point and a zoom end point. Moreover, the indication of the zoom start and end points are received relative to an active unit of measure of the horizontal or vertical dimension of the active zoom plot. If at least one inactive plot is to be synchronized, the method includes converting the zoom start point to an inactive zoom start point in an inactive unit of measure of the synchronized dimensions of the at least one inactive zoom plot using a preset transfer function for each of the at least one inactive plot. Also, the method includes converting the zoom end point to an inactive zoom end point in the inactive unit of measure using the preset transfer function for each of the at least one inactive plot if at least one inactive plot is to be synchronized. Furthermore, the method includes zoom of the at least one inactive plot based at least in part on the converted zoom start and end points if the at least one inactive plot is to be synchronized.

In a third embodiment, a non-transitory, computer-readable medium has stored thereon instructions that, when executed, are configured to cause a processor to cause the display of a graphical visualization of multiple data plots. The multiple data plots each have a horizontal and vertical dimension and include an active zoom plot and an inactive zoom plot. The instructions are also configured to cause the processor to determine that the inactive zoom plot is to be synchronized with the active zoom plot in the horizontal or vertical dimension when zooming the active zoom plot. Additionally, the instructions are configured to cause the processor to receive an indication that the active zoom plot is to be zoomed to an active zoom area. The active zoom area includes a zoom start point and a zoom end point in the horizontal or vertical dimension. The instructions are also configured to cause the processor to zoom the active zoom plot based at least in part on the indication. The instructions are also configured to cause the processor to zoom the inactive zoom plot by rescaling the horizontal or vertical dimension by converting the zoom start point and the zoom end points to corresponding inactive zoom start and end points in the inactive zoom plot using a transfer function if the inactive zoom plot is to be synchronized.

BRIEF DESCRIPTION OF THE DRAWINGS

These and other features, dimensions, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to methods and systems of applying synchronized zooming across multiple embodiments in monitoring system, such as industrial HMI systems. In some embodiments, the HMI may include multiple plots corresponding to various data, such as a plot for each of multiple pieces of equipment at the same time, a single piece of equipment at multiple time periods, multiple pieces of equipment captured at different times, same or different measurements from various sensors on a single piece of equipment at the same time or at different times, or some combination thereof.

In particular, as the operator begins a zoom within one plot of the area or graphical device, a corresponding zoom may be automatically previewed in other plots. This corresponding zoom may occur in real time or near real time allowing for coordinated viewing of multiple plots, views, etc. simultaneously.

For example, a synchronized zoom may enable an operator to quickly zoom across multiple similar plots simultaneously even when units may be different but have a transfer function between (e.g., $T=1/f$, etc.). Synchronized zooms may also be shown across the multiple plots by using solid lines for an actively selected zoom and dashed lines for zooms in inactive areas (e.g., areas not being currently actively manipulated). Synchronized zooming may also be applied in reverse zooming situations where a plot is being zoomed out. In some embodiments, when a synchronized zoom may extend beyond an edge of an inactive plot, visual alerts may be presented as any suitable visual representation for alerting an operator that the zoom extends beyond the edge of the plot.

Figure 1:
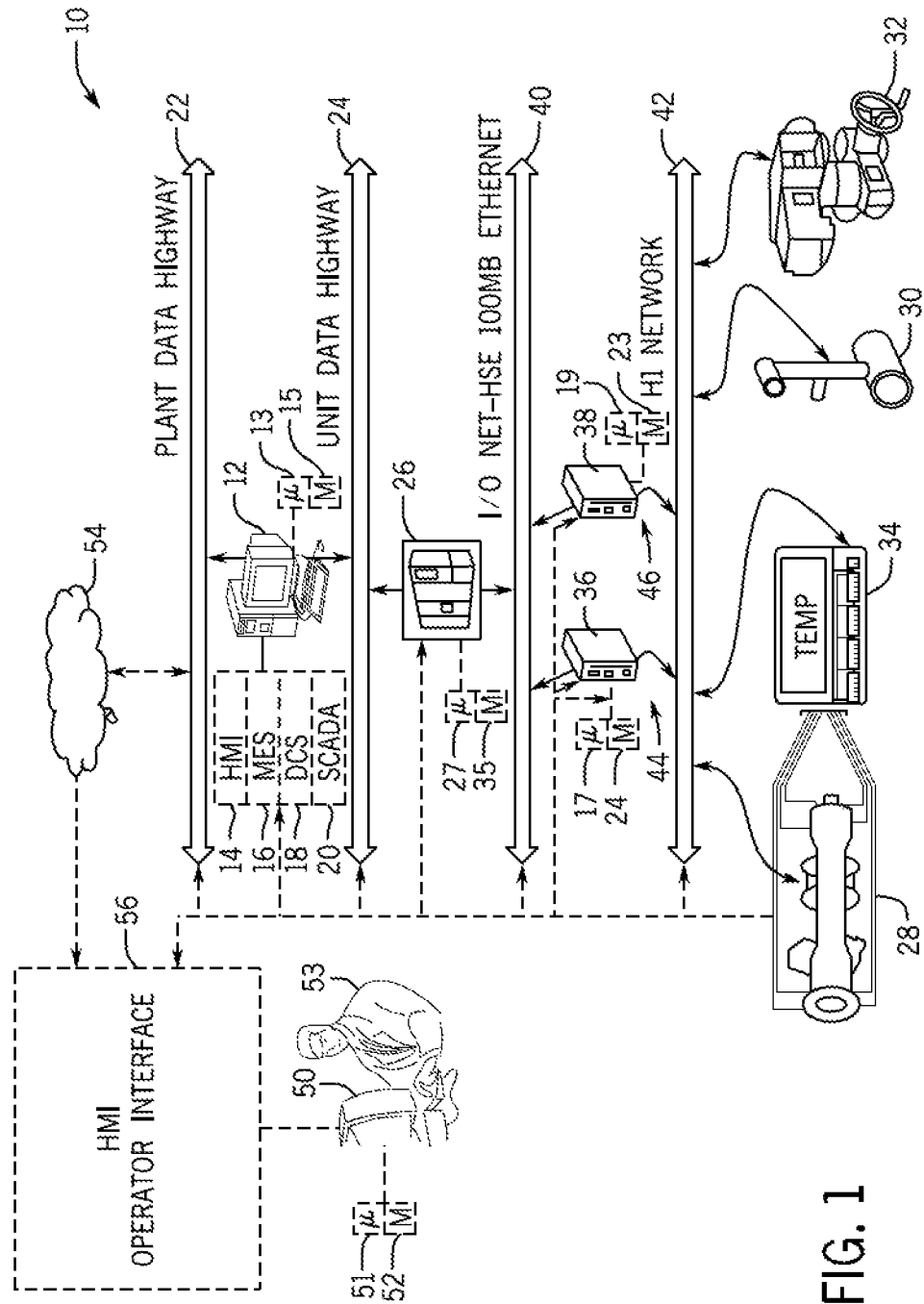
FIG. 1 is a block diagram of an embodiment of an condition monitoring system including an HMI operator interface in accordance with present embodiments.

With the foregoing mind, it may be useful to describe an embodiment that may display multiple plots such as a conditioning system for an industrial process control system 10 as depicted in FIG. 1. The control system 10 may include a computer 12 suitable for executing a variety of field device configuration and commissioning applications, and for providing an operator interface through which an engineer or technician may monitor the devices of the control system 10. Accordingly, the computer 12 may include a processor 13 that may be used in processing computer instructions, and a memory 15 that may be used to store computer instructions and other data. These instructions may be encoded in programs stored in tangible non-transitory computer-readable medium such as the memory 15 or other storage. The computer 12 may include any type of computing device suitable for supporting software applications, such as a laptop, a workstation, a tablet computer, or a handheld portable device (e.g., personal digital assistant or cell phone). Indeed, the computer 12 may include any of a variety of hardware and/or operating system platforms.

In accordance with some embodiments, the computer 12 may host industrial condition monitoring software, such as a human-machine interface (HMI) (e.g., combined software and hardware system) 14, a manufacturing execution system (MES) 16, a distributed control system (DCS) 18, and/or a supervisor control and data acquisition (SCADA) system 20. The HMI 14, MES 16, DCS 18, and/or SCADA 20 may include executable code instructions stored on non-transitory tangible computer readable media, such as the memory 15 of the computer 12. For example, computer 12 may support PowerOn™ suite, ControlST™, ToolboxST™ software, System 1® Condition Monitoring Software, available from General Electric Co., of Schenectady, N.Y., vibration monitoring software, and/or other condition monitoring software.

Further, in certain embodiments, the computer 12 may be communicatively connected to a plant data highway 22 which may allow for enabling communication between the depicted computer 12 and other computers in the plant. Indeed, the industrial control system 10 may include multiple computer systems interconnected through the plant data highway 22. The computer 12 may be further communicatively connected to a unit data highway 24, which may couple the computer 12 to an industrial controller 26. The industrial controller 26 may include a processor 27 and a memory 35 suitable for executing and storing computer instructions and/or control logic useful in automating a variety of plant equipment, such as a turbine system 28, a valve 30, a pump 32, and a temperature sensor 34. Other plant equipment may include flow meters, vibration sensors, pressure transmitters, level transmitters, actuators, relays, and so forth.

In certain embodiments, the turbine system 28, the valve 30, the pump 32, and the temperature sensor 34 may be communicatively coupled to the industrial controller 26 by using linking devices 36 and 38 suitable for interfacing between an I/O network 40 and an H1 network 42 (i.e., a fieldbus network operating at 31.25 kbits/second.). As depicted, the linking devices 36 and 38 may include processors 17 and 19, respectively, useful in executing computer instructions, and may also include memory 24 and 23, useful in storing computer instructions and other data. In certain embodiments, the I/O network 40 may be a 100 Megabit (MB) high speed Ethernet (HSE) network, and the H1 network 42 may be a 31.25 kilobit/second network. Accordingly, data transmitted and received through the I/O network 40 may in turn be transmitted and received by the H1 network 42. That is, the linking devices 36 and 38 may act as bridges between the I/O network 40 and the H1 network 42. For example, higher speed data on the I/O network 40 may be buffered, and then transmitted at suitable speed on the H1 network 42. Accordingly, a variety of field devices may be linked to the industrial controller 26 and to the computer 12.

Each of the linking devices 36 and 38 may include one or more segment ports 44 and 46 useful in segmenting the H1 network 42. For example, the linking device 36 may use the segment port 44 to communicatively couple with the device 28 and 34, while the linking device 38 may use the segment port 36 to communicatively couple with the devices 30 and 32. Distributing the input/output between the devices 28, 30, 32, and 34 by using, for example, the segment ports 44 and 46, may enable a physical separation useful in maintaining fault tolerance, redundancy, and improving communications time.

In certain embodiments, the HMI 14 may be executable by computer 50 (e.g., including processor 51 and memory 52), which may be used by an operator 53 to interface with the industrial control system 10 via an HMI operator interface 56. Accordingly, the computer 50 may include various input and output devices (e.g., mouse, keyboard, monitor, touch screen, printer, eye-tracking display, or other suitable input or output device) such that the operator 53 may provide commands (e.g., control and/or operational commands) to the industrial control system 10 and receive reports from the industrial control system 10. Furthermore, in certain embodiments, the computer 50 may be communicatively coupled to the computer system 12 (e.g., the HMI 14) through direct or indirect techniques in order to receive information regarding the operation of the HMI 14. For example, a signal conduit (e.g., cable, wireless router) may be used to directly couple the computer 50 to the computer 12. Likewise, a file transfer mechanism (e.g., remote desktop protocol (RDP), file transfer protocol (FTP), manual transfer, or other suitable mechanism) may be used to indirectly send or to receive data (e.g., files, firmware, updates). Further, cloud 54 computing techniques may be used, in which all or part of the HMI 14 resides in the cloud 54 and communicates directly or indirectly with the computer system 12 (e.g., via a network or the Internet). As will be further appreciated, the HMI 14 may allow the operator 53, for example, to perform a semantic zoom of one or more components of the industrial control system 10.

Figure 2:
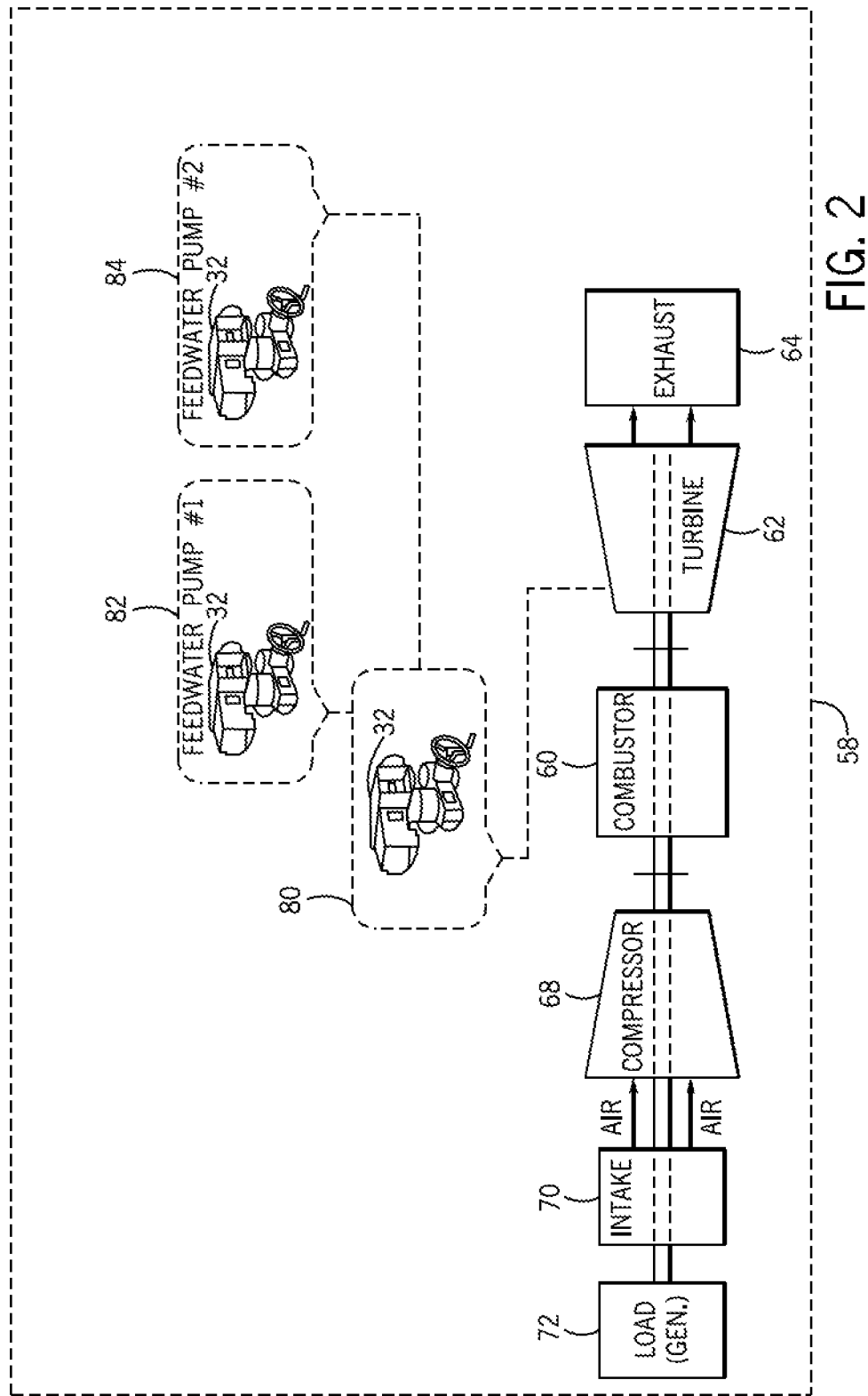
FIG. 2 is a block diagram of an embodiment of the HMI operator interface of FIG. 1 including a semantic zoom of a turbine-generator system in accordance with present embodiments.

In certain embodiments, such as the HMI operator interface 56 as depicted in FIG. 2, the HMI operator interface 56 of the computer system 12 may include a graphical display representative from various sources. It should be appreciated that the turbine-generator system 58 is included merely for the purpose of illustration. Other embodiments may include a variety of industrial systems such as various power plants (e.g., electrical power, mechanical power, hydroelectric power, and nuclear power), chemical plants, manufacturing plants, oil and gas refineries, and the like. Furthermore, in some embodiments, the synchronous zooming discussed herein may be used for non-industrial systems that include multiple data sources and/or time periods for data. As depicted, the HMI operator interface 56 may be used to monitor an industrial system during real-time, near real-time operation, and/or subsequent to operation of the industrial system. For example, the graphical turbine-generator system 58 may include a combustor 60, a turbine 62, an exhaust 64, a compressor 68, an intake 70, and a generator 72. It should be appreciated that each of the components (e.g., turbine 62, generator 72, compressor 68) may include a number of sensors (e.g., temperature sensor 34, as well as pressure transmitters, flow transmitters, level transmitters, fuel sensors, clearance sensors, and so forth) and field devices (e.g., pump 32, valve 30, as well as actuators, relays, and so forth).

The sensors and transmitters may be used to monitor and control various physical, environmental, and operational parameters related to the operation and performance of the turbine-generator system 58. In certain embodiments, the parameters may include ambient temperature, ambient pressure, humidity, air quality, exhaust gas temperature, rotor speed, engine temperature, engine pressure, fuel temperature, engine fuel flow, exhaust flow, vibration, clearance between rotating and stationary components, compressor discharge pressure, or other suitable parameters. Information relating to the parameters may be tracked and displayed in the HMI operator interface 56 using multiple plots.

In certain embodiments, an operator (e.g., operator 53) monitoring the turbine-generator system 58 may wish to observe a zoom view of one or more of the plots. The presently disclosed embodiments may allow the operator 53 to perform a synchronized zoom of plots related to the sensors and/or field devices. For example, in one embodiment, as further depicted in FIG. 2, the operator 53 may view plots related to a class 80 of the sensors or devices, such as feedwater pumps 82 and 84. It may again be worth noting that the illustration of FIG. 2 is included merely for the purpose of illustration. In other words, as previously discussed, any number of sensors (e.g., temperature sensor 34, vibration sensors, and the like) and field devices (e.g., valve 30 and the like) may be coupled to any number of components (e.g., turbine 62, generator 72, compressor 68, pumps, reciprocating compressors, gearboxes, and/or other similar components) of the monitored system. Furthermore, as will be further appreciated with respect to FIG. 3A and FIG. 3B, a synchronized zoom may be performed to display specific areas, zones, time periods, and sensors within the industrial facility, and so forth. The areas may include nearby, inside, about, or to a portion of the gas turbine system 62, the compressor 68, the load 72, or any other component, machinery, and/or areas that may be included with an industrial system.

Figure 3A:
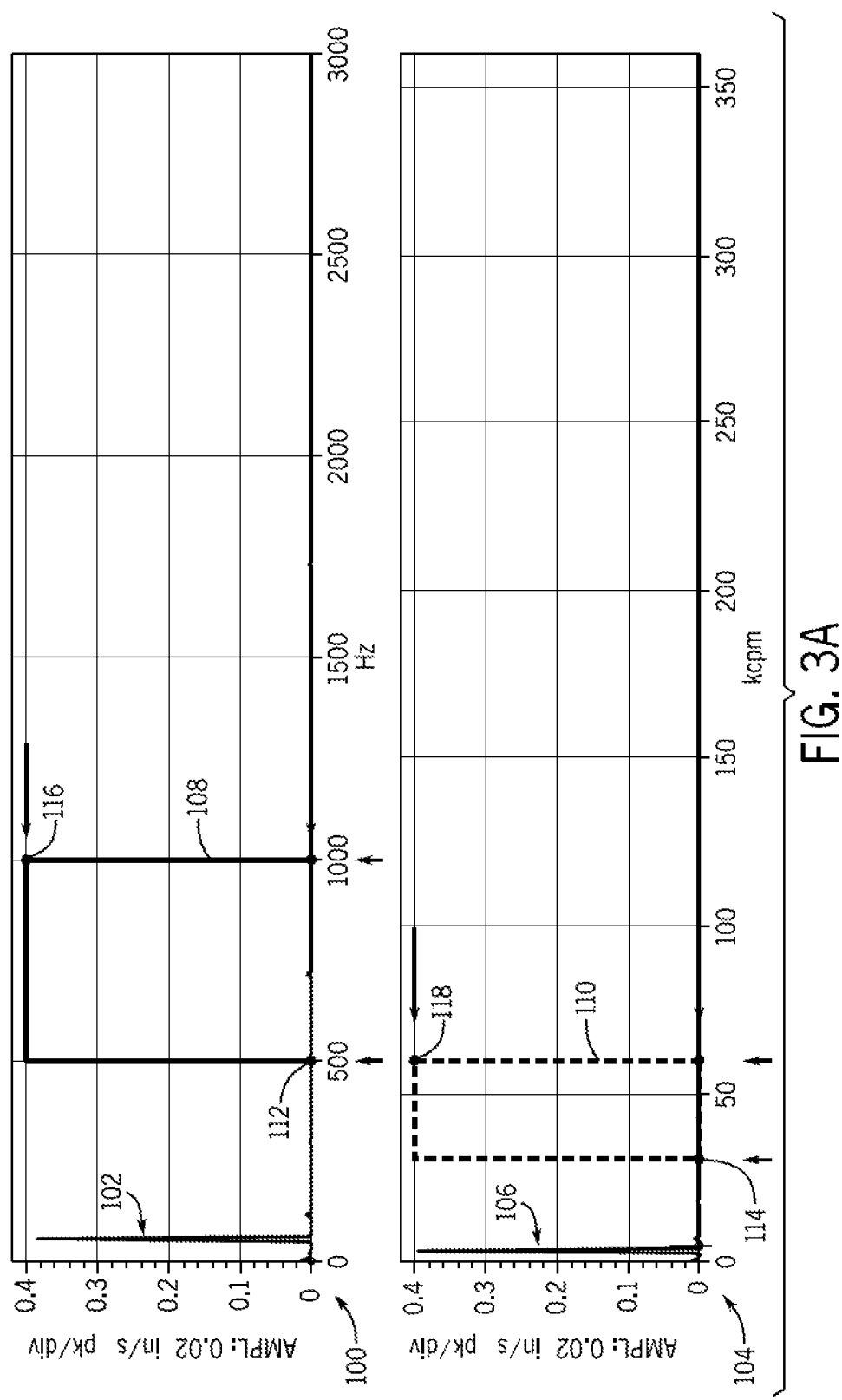
FIG. 3A illustrates a pre-zoom display of plots, in accordance with present embodiments.

FIG. 3A illustrates a pre-zoom display of a first plot 100 having a first graph 102 and a second plot 104 having second graph 106. The first plot 100 corresponds to an active area that is being actively manipulated. The second plot 104 corresponds to an inactive area that corresponds to the first plot 100. For example, in certain embodiments, the first plot 100 might be a trend measured at a sensor with the second plot 104 being a related trend such that the trends together form a stack trend that may include 1, 2, 3, 4, or more plots. In some embodiments, the plots 100 and 104 may correspond to measurements at different points in time (e.g., timebases). In some embodiments, when a zoom is performed in an active area (e.g., first plot 100), a solid zoom box 108 is used to illustrate an area of interest upon which the zoom will occur. A corresponding dotted zoom box 110 may be presented on an inactive area. When the plot 104 is synchronized with the plot 100, a zoom in the active area may be used to zoom in the inactive area using the same scales selected in the active area. In certain embodiments, the plots 100 and 104 may be synchronized vertically (e.g., height, ordinate, y-axis), horizontally (e.g., width, abscissa, x-axis), and/or other suitable axes (e.g., depth, applicate, z-axis, time dimension, etc.). Furthermore, as illustrated in the current embodiment, when two plots have different units of measure (e.g., Hz, cycles per minute (cpm), etc.) that have a mappable function, the plots 100 and 104 may be resized based on the conversion. For example, in plot 100, when the zoom box 108 is selected to begin at active zoom start 112 (e.g., 500 Hz), the processor 13 converts the value for the active zoom start 112 to a corresponding value for inactive zoom start 114 (e.g., 30 kcpm). Similarly, the zoom box 108 may have an active zoom end point 116 (e.g., 1,000 Hz) that the processor 13 converts to an inactive zoom end 118 (e.g., 60 kcpm). In other words, as long as a known translation function exists between a horizontal scale of the first plot 100 and the second plot 104, the horizontal aspects (e.g., horizontal dimension) of the plots 100 and 104 may be synchronized. Although the foregoing discussion only discusses horizontal synchronization, some embodiments may include horizontal and/or vertical synchronization of zooming.

Figure 3B:
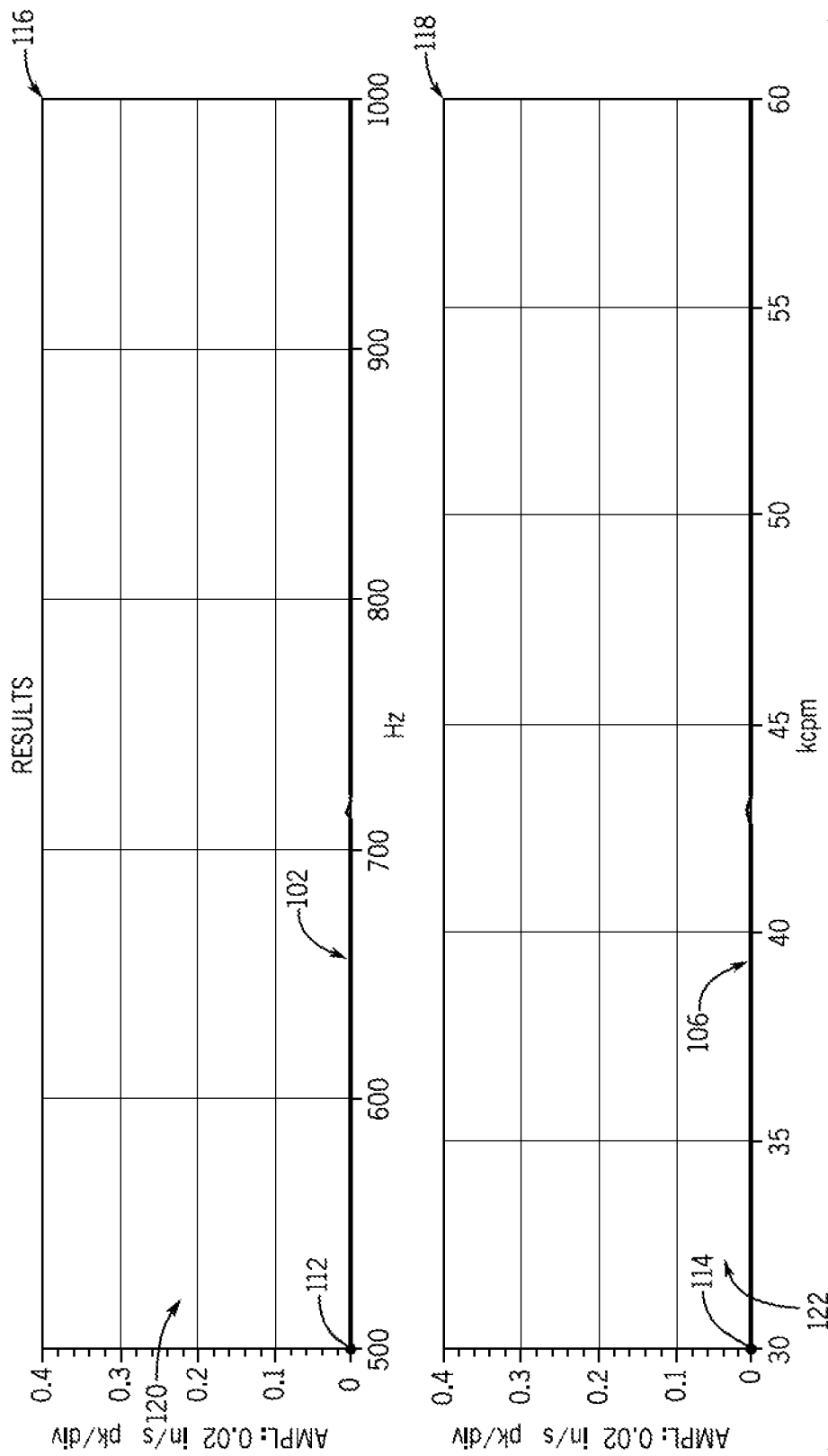
FIG. 3B illustrates a post-zoom display of the plots of FIG. 3A, in accordance with present embodiments.

FIG. 3B shows a first result plot 120 and a second result plot 122 that may result from the zoom box 108. As illustrated, the first result plot 120 includes a zoomed view of a portion of the graph 102 that is located in the zoom box 108. Specifically, the entire first result plot 120 is located between a rectangular box formed by active zoom start 112 and the active zoom end 116 both horizontally and vertically. Similarly, the entire second result plot 122 is located between a rectangular box formed by inactive zoom start 114 and the inactive zoom end 118 both horizontally and vertically. Since the first and second plots 100 and 104 included an equivalent vertical zoom, the vertical scale for the first and second result plots 120 and 122 may have been synchronized or may have merely retained an original scale, as discussed below.

Figure 4A:
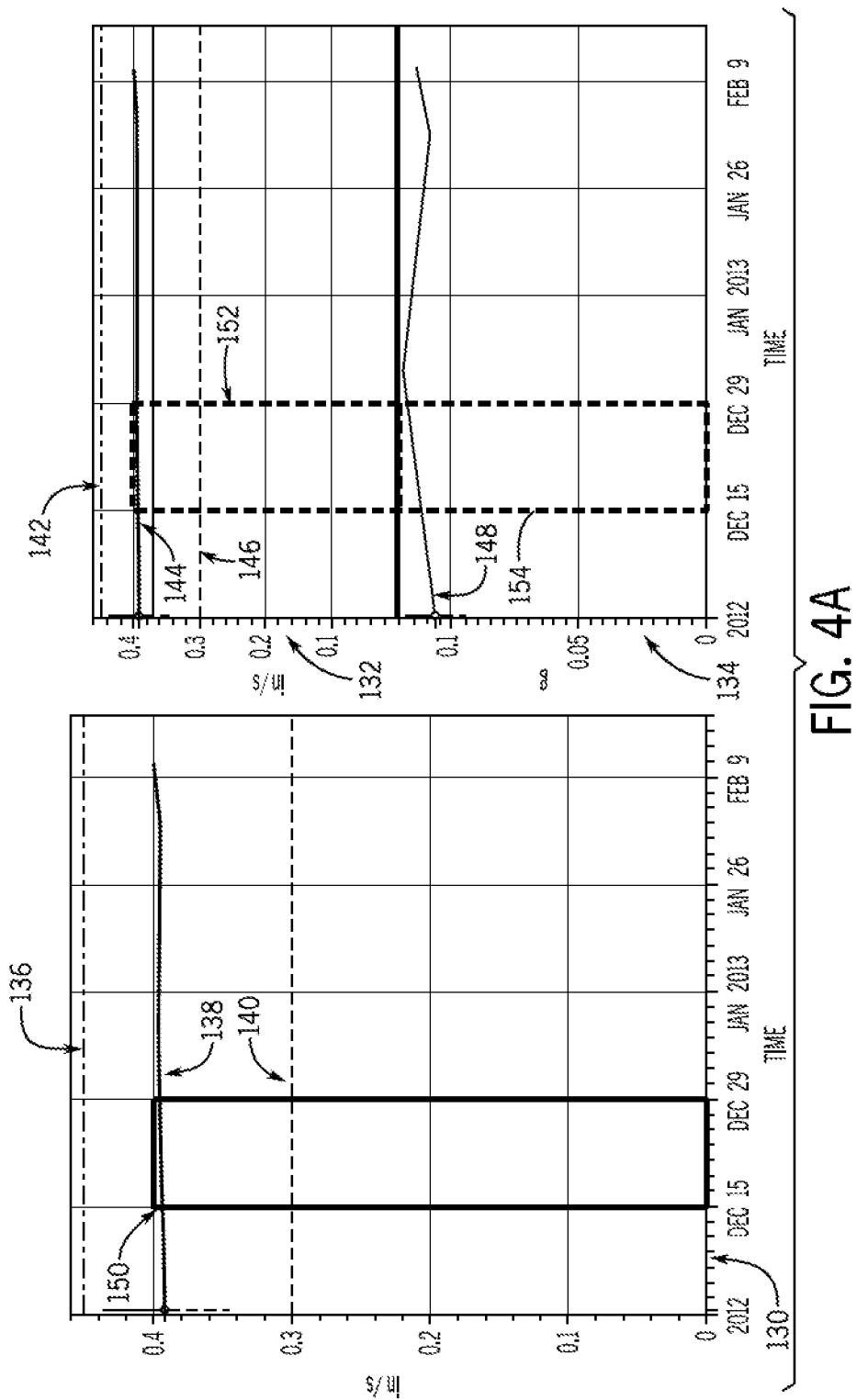
FIG. 4A illustrates a pre-zoom display of plots, in accordance with present embodiments.

FIG. 4A illustrates a first plot 130, a second plot 132, and a third plot 134, collectively referred to as the plots 130-134. As illustrated, the first plot 130 is the actively manipulated plot that includes lines 136, 138, and 140; the second plot 132 is an inactive area including lines 142, 144, and 146; and the third plot 134 is an inactive area including a line 148. The lines 136, 138, 140, 142, 144, 146, and 148 may include data reflecting actual measurements, expected values, thresholds, other suitable data represented in line form in a plot, or some combination thereof. When an active zoom box 150 is created in the first plot 130, similar zoom inactive zoom boxes 152 and 154 are created in the second plot 132 and the third plot 134, respectively. Each of the plots 130-134 has an abscissa measuring a time base that is represented on the same scale in each of the plots 130-134.

Furthermore, in the current embodiment, plots 130-134 may be synchronized in their respective horizontal aspects to cause a zoom in any of the plots 130-134 to result in a similar zoom in the other plots. For example, the active zoom box 150 may be selected from Dec. 15 to Dec. 29 and corresponding inactive zoom boxes 152 and 154 may also be selected for the same period.

However, there exists situations in which the various plots 130-134 do not have consistent vertical scales, but the zooming may be vertically synched if a transfer function exists between the units of measurements (e.g., in/s, g, etc.). In the current embodiment, the plots 130 and 132 are vertically synchronized, but the plot 134 is not synchronized with the plots 130 and 132. For example, in some embodiments, there may not be a transfer function or an operator may select which plots are to be synchronized by indicating whether each plot should be individually synchronized horizontally and/or vertically with an actively manipulated plot. Additionally or alternatively, links may be created between plots (e.g., plots 130 and 132) that cause one plot to be synchronized in one or more aspect when a linked plot is an actively zoomed plot.

As previously discussed, plots 130 and 132 are vertically synchronized. Accordingly, when a zoom is performed within either plot 130 or plot 132, the other plot is zoomed to the same scale. However, since plot 134 is not vertically synchronized with plots 130 or 132, if a zoom is performed within either plot 130 or plot 132, the plot 134 will not undergo a synchronized zoom in the vertical dimension but may be synchronously zoomed in the horizontal dimension. In some embodiments, the plot 134 may remain on a pre-zoom scale in the vertical aspect of the plot 134 while a zoom is performed in the horizontal aspect of the plot 134. Additionally or alternatively, the plot 134 may be zoomed in the vertical aspect in an amount proportional to an amount of zoom of the horizontal aspect of the plot 134.

Figure 4B:
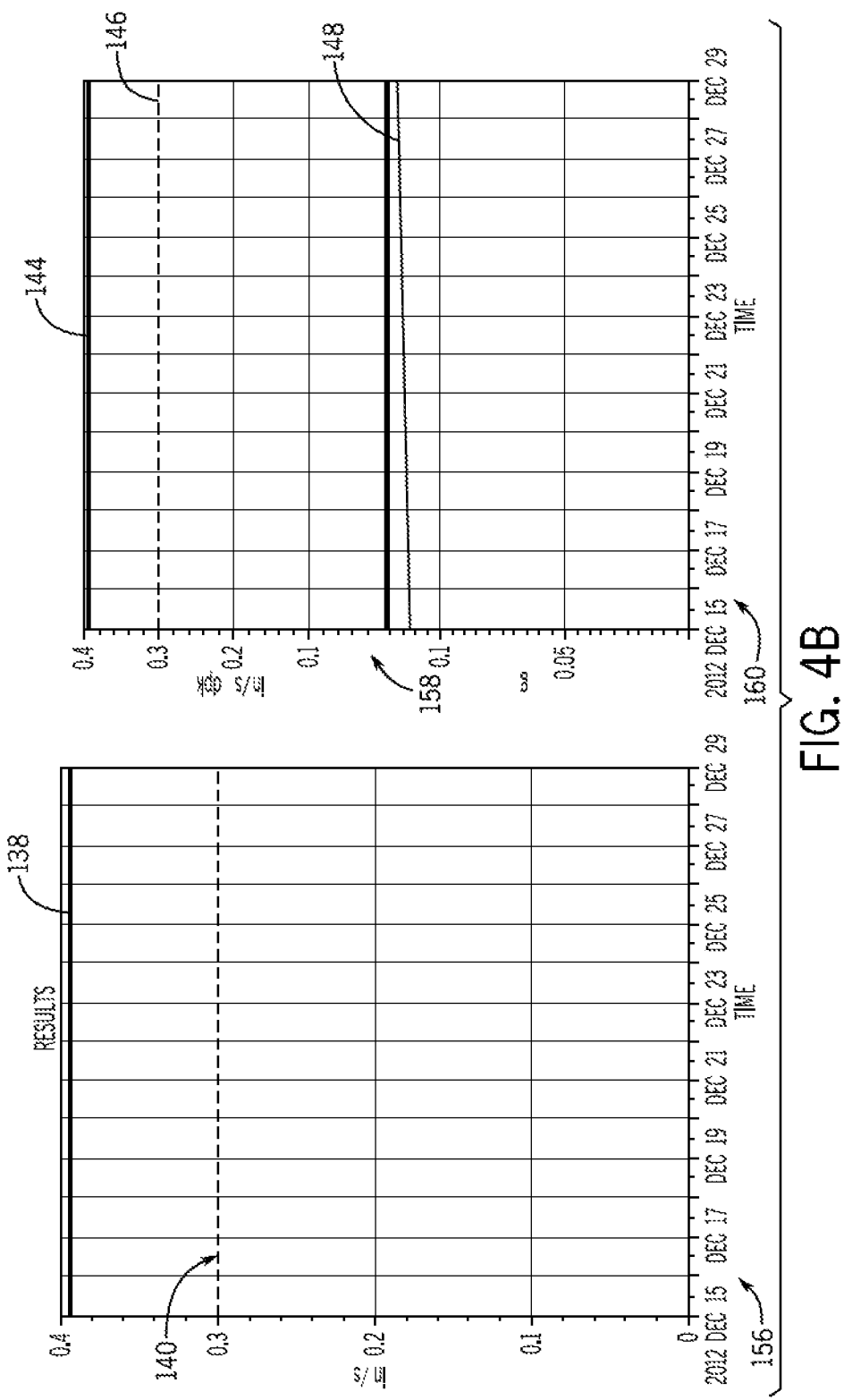
FIG. 4B illustrates a post-zoom display of the plots of FIG. 4A, in accordance with present embodiments.

FIG. 4B illustrates result plots 156, 158, and 160. Result plot 156 corresponds to a zoomed view of plot 130, result plot 158 corresponds to a zoomed view of plot 132, and result plot 160 corresponds to a zoomed view of plot 134. The result plot 156 includes portions of the lines 138 and 140 located within the active zoom box 150. But the line 136 from the result plot, because the line 136 is outside the active zoom box 150 in the plot 130. Similarly, the line 142 is omitted from result plot 158, because the line 142 is located outside the inactive zoom box 152 of the plot 132. Accordingly, only portions of lines 144 and 146 in the inactive zoom box 152 are included in the result plot 158. Result plot 160 includes the portion of the line 148 that passes through the inactive zoom box 154 of the plot 134. As illustrated, the horizontal aspects of the result plots 156-160 include the same horizontal scale as each other resulting from a synchronized horizontal zoom, and the vertical aspects of the result plots 156 and 158 include the same vertical scale resulting from a synchronized vertical zoom. In the current embodiment, the vertical scale of the result plot 160 is the same as the original scale of the plot 134, because the plot 134 was not vertically synchronized with the plot 130.

Figure 5A:
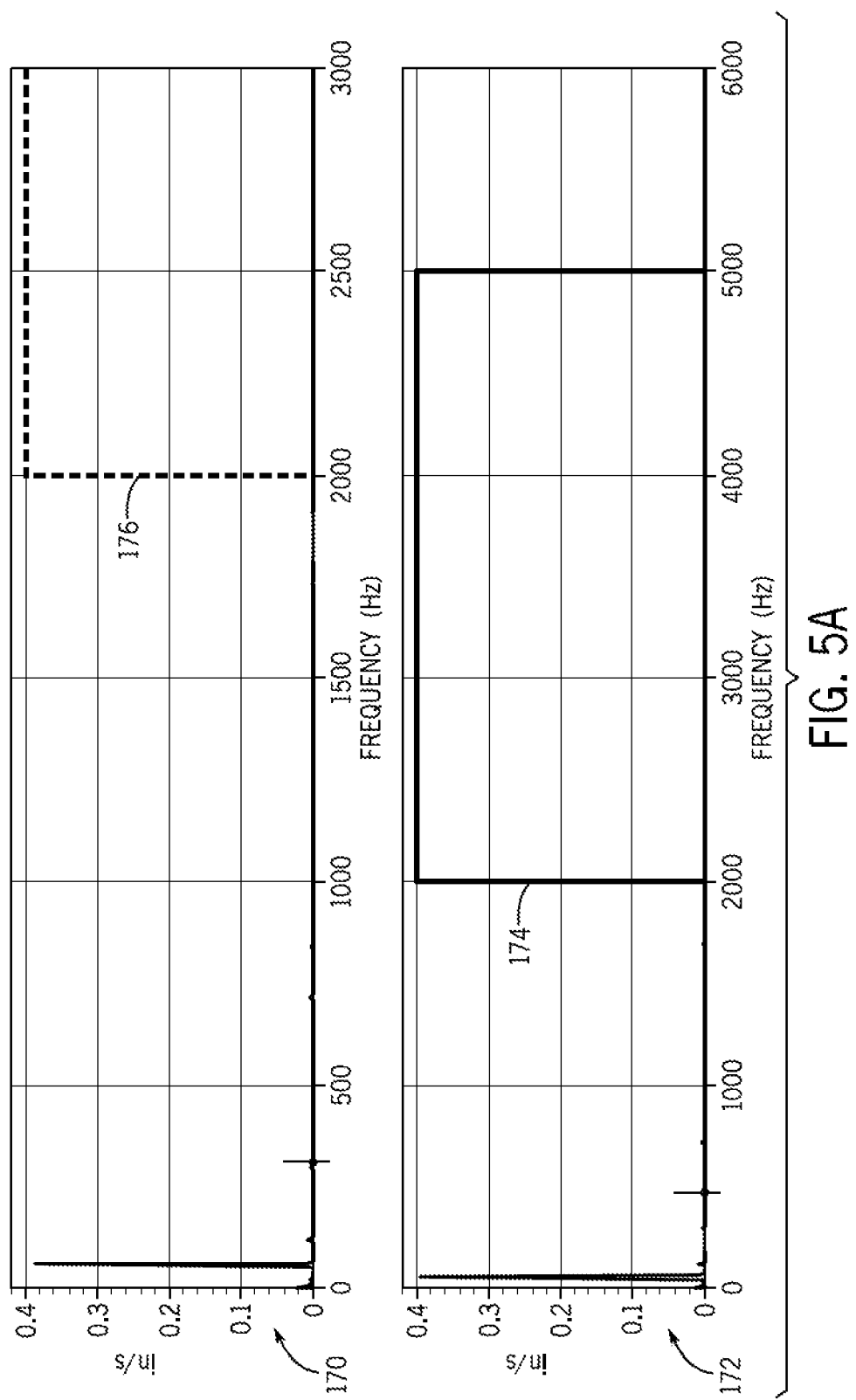
FIG. 5A illustrates a pre-zoom display of plots, in accordance with present embodiments.
Figure 5B:
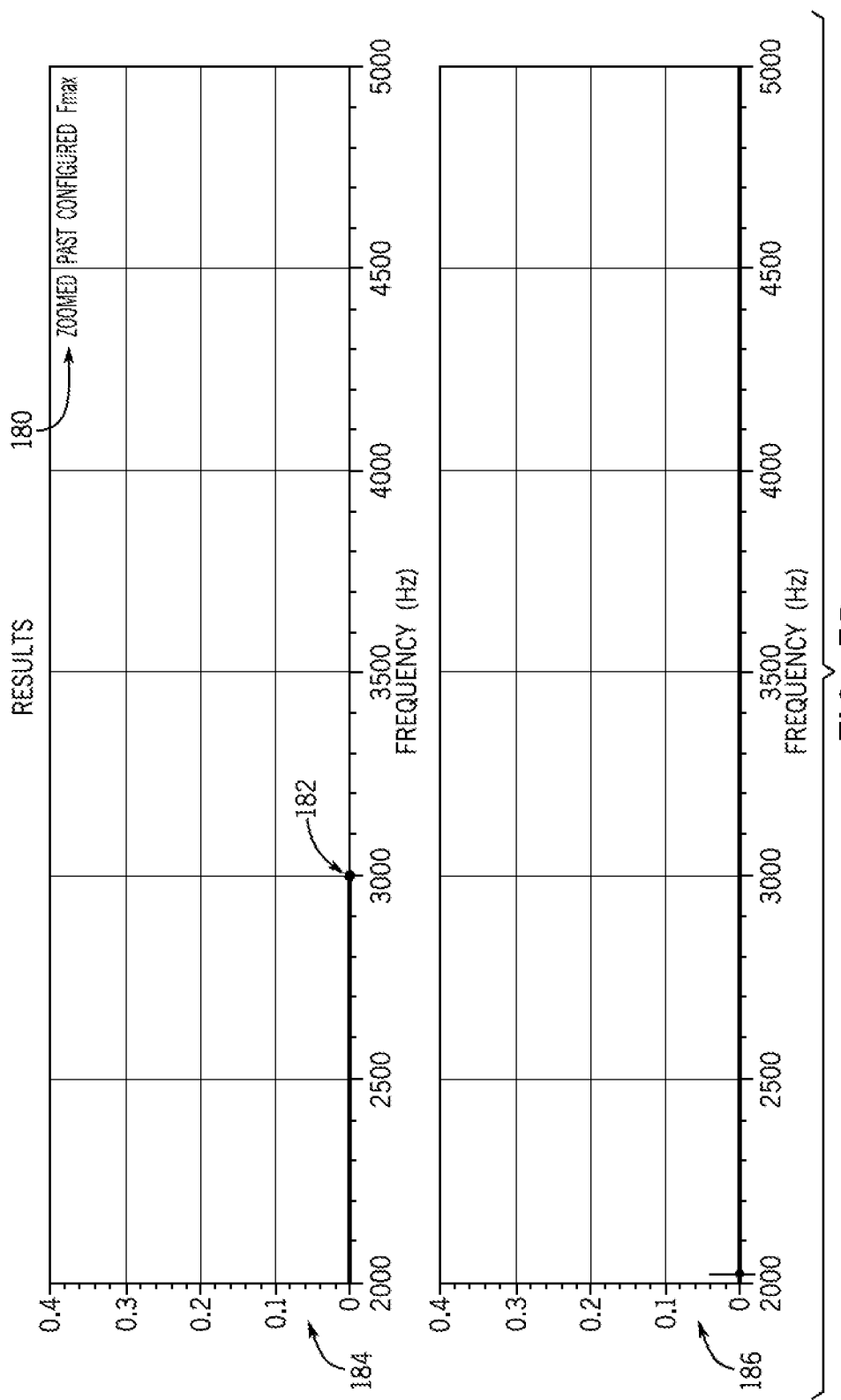
FIG. 5B illustrates a post-zoom display of the plots of FIG. 5A, in accordance with present embodiments.

When two plots are synchronously zoomed and the zoom extends beyond a known data point for one of the plots, the processor 13 may issue feedback to an operator 53 indicating that the zoom extends beyond a maximum value for one of the plots. For example, FIG. 5A illustrates plots 170 and 172 both having an abscissa corresponding to a frequency and an ordinate corresponding to in/s. When an active zoom box 174 is created in the plot 172 from 2000 Hz to 5000 Hz, an inactive zoom box 176 is created in the plot 170 that begins at 2000 Hz and extends to an end of the plot 170 (e.g., 3000 Hz). When an inactive zoom box extends to an end of a plot, an operator 53 might be alerted to verify that the zoom pertains to values outside the plot. In some embodiments, additional alerts (e.g., popup boxes, color highlights, text, sound) may be presented to the operator indicating that the zoom extends past the plots boundaries. For example, FIG. 5B illustrates a possible alert text 180 that may be used to alert an operator 53 that the zoom extended beyond a maximum value 182 for the plot 170 when representing result plots 184 and 186. In other embodiments, alerts may be displayed prior to a zoom, and the alerts may block the zoom when a portion of the zoom extends beyond a maximum or minimum value for a plot that is not being actively zoomed.

Figure 6A:
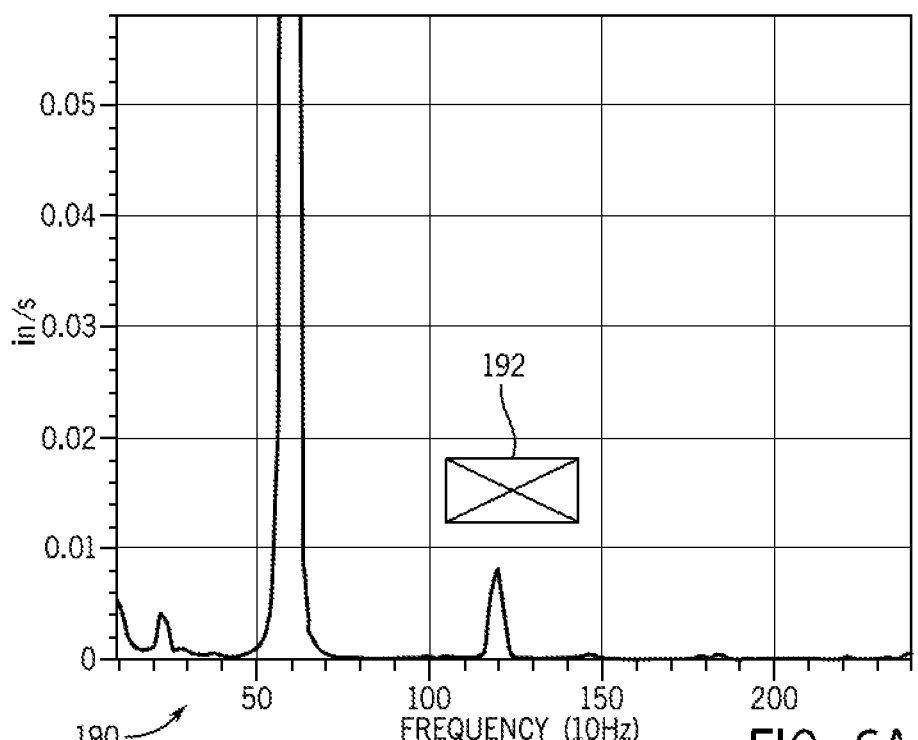
FIG. 6A illustrates a pre-unzoom display of an active plot, in accordance with present embodiments.
Figure 6B:
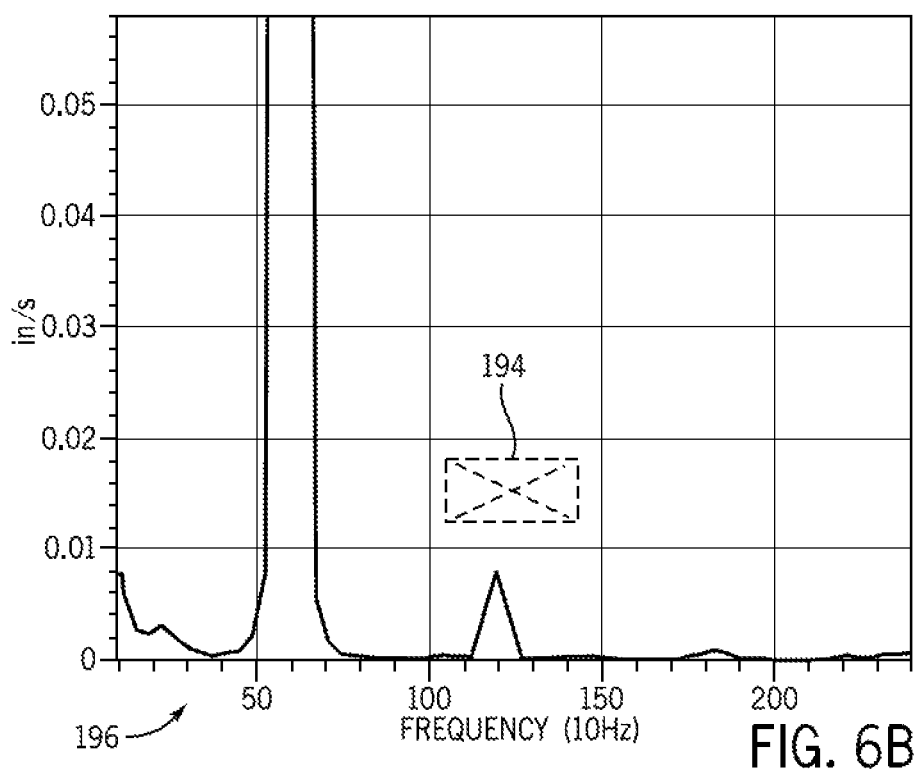
FIG. 6B illustrates a pre-unzoom display of the an inactive plot corresponding to the active plot of FIG. 6A, in accordance with present embodiments.

Although the foregoing discussion specifically discussing synchronous zooming in the context of zooming into a plot, synchronized unzooming (e.g., reverse zoom, zooming away, zooming out) may also be performed. FIG. 6A illustrates an active plot 190 that may be unzoomed using an active unzoom box 192 detailing that an unzoom is going to occur. In some embodiments, the active unzoom box 192 may indicate a location and/or amount of unzooming to be performed. FIG. 6B illustrates an inactive unzoom box 194 indicating that a corresponding unzoom is going to occur. In some embodiments, the inactive unzoom box 194 may illustrate an amount and/or location of unzoom relative to an inactive plot 196. In certain embodiments, the unzoom may return to a scale that was used prior to the previous zoom. In some embodiments, the scales of the horizontal and/or vertical aspects may be synchronized between the plots 190 and 196 to reproduce the same scale in the horizontal and/or vertical aspects when the unzoom is performed.

Figure 7:
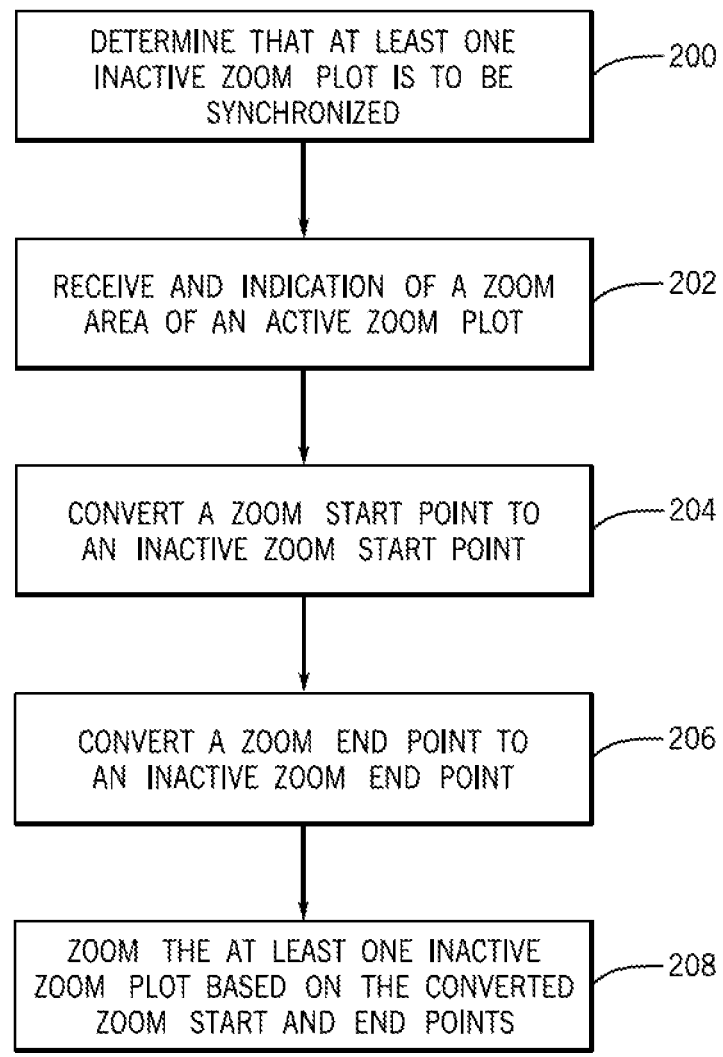
FIG. 7 is a flowchart illustrating an embodiment of a process for performing a synchronous zoom in accordance with present embodiments.

FIG. 7 is a flowchart illustrating a process for synchronizing zooming across multiple plots. The processor 13 determines that at least one inactive zoom plot (e.g., plot 132) is to be synchronized with an active zoom plot (e.g., plot 130) when the active zoom plot is to be zoomed, wherein the synchronization is in a horizontal or vertical aspect of the at least one inactive plot and the active zoom plot (block 200). In some embodiments, the processor 13 may cause a display of graphical visualization of the data plots with each plot having a horizontal and vertical aspect. The processor 13 also receives an indication of a zoom area (e.g., zoom area 150) of the active zoom plot comprising a zoom start point (e.g., point 114) and a zoom end point (e.g., point 116), wherein the indication of the zoom start and end points are received relative to an active unit of measure of the horizontal or vertical aspect of the active zoom plot (block 202). If the processor 13 determines that at least one inactive plot is to be synchronized, the processor 13 converts the zoom start point to an inactive zoom start point in an inactive unit of measure of the synchronized aspects of the at least one inactive zoom plot using a transfer function (block 204). Furthermore, if the processor 13 determines that at least one inactive plot is to be synchronized, the processor 13 converts the zoom end point to an inactive zoom end point in the inactive unit of measure using the transfer function (block 206). Moreover, if the processor 13 determines that at least one inactive plot is to be synchronized, the processor 13 zooms the at least one inactive plot based at least in part on the converted zoom start and end points (block 208). In some embodiments, the processor 13 may zoom the inactive plot in real time or near real time of a corresponding active plot zoom. In some embodiments, the processor 13 may perform the forgoing steps by executing instructions that are stored in the memory 15, 24, or 35. Furthermore, in some embodiments, the processor 13 may cause a display of representations of the plot via a display of the computer 12.

Although the foregoing discussion contemplates manual manipulation of zoom start and end points from a user, other embodiments may be employed to determine a zoom area. For instance, in some embodiments, a zoom may be initiated by using a rolling or scrolling movement using a movement of a mouse, a movement of a mouse wheel, a trackpad, a touch screen, or other suitable input devices for communicating a desire to zoom, a location of a zoom, and/or amount of zoom. In some embodiments, the zoom area may be entered using a keyboard (graphical or actual), a zoom value picker, and/or other input techniques. Furthermore, in certain embodiments, the zoom area may be quickly moved within a plot using a suitable manipulation technique (e.g., mouse drag, mouse wheel scroll, etc.)

In other words, the technical problem addressed by the application relates to a need for quickly enabling identification of a state of a machine. This disclosure presents a technical advantage by quickly and automatically presenting data for identification of states of machines by visually coordinating the data with other data from other times or machines that correspond to similar states that might have been previously identified.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
turbomachinery;
a processor configured to:
sense operation of the turbomachinery;
cause a display to display a graphical visualization of a plurality of data plots, related to the operation of the turbomachinery wherein each of the plurality of data plots has a plurality of dimensions, wherein the plurality of data plots comprises:
an active zoom plot plotted against a first unit of measure in a dimension of the plurality of dimensions of the active zoom plot; and
an inactive zoom plot plotted against a second unit of measure in the dimension of the plurality of dimensions of the active zoom plot;
determine that the inactive zoom plot is to be synchronized with the active zoom plot in the dimension of the plurality of dimensions when zooming the active zoom plot;
receive an indication that the active zoom plot is to be zoomed, wherein the indication comprises a zoom start point and a zoom end point in the dimension;
zoom the active zoom plot based at least in part on the indication;
when the inactive zoom plot is to be synchronized, determine if a preset transfer function is available to convert values in the first unit of measure to corresponding values in the second unit of measure;
when the preset transfer function is available, zoom the inactive zoom plot by rescaling the dimension by converting the zoom start point and the zoom end point to a corresponding inactive zoom start point and an inactive zoom end point in the inactive zoom plot using the preset transfer function; and
when the preset transfer function is not available, do not zoom one or more dimensions of the inactive zoom plot.

2. The system of claim 1, wherein the dimension comprises a horizontal dimension or a vertical dimension of one or more of the plurality of data plots.

3. The system of claim 2, wherein the dimension comprises a first, second, and third dimension of one or more of the plurality of data plots.

4. The system of claim 1, wherein the processor is configured to determine that one or more of the plurality of dimensions of the inactive zoom plot are not to be synchronized, wherein zooming the inactive zoom plot comprises maintaining the dimensions not to be synchronized.

5. The system of claim 1, wherein the processor is configured to cause a display of an alert that a converted inactive zoom start or end point extends beyond an edge of the inactive zoom plot.

6. The system of claim 1, wherein the processor is configured to cause a display of the indication on the active zoom plot using a solid line.

7. The system of claim 1, wherein the processor is configured to cause a display of an inactive zoom indication on the inactive zoom plot using a dashed line.

8. The system of claim 1, wherein the processor is configured to rescale the at least one dimension while not zooming the one or more dimensions of the inactive zoom plot.

9. A method, comprising:
determining that at least one inactive zoom plot is to be synchronized with an active zoom plot when the active zoom plot is to be zoomed, wherein the synchronization is in a horizontal or vertical dimension of the at least one inactive plot and the active zoom plot, and the active zoom plot and the at least one inactive plot correspond to operation of turbomachinery;
receiving an indication of a zoom area of the active zoom plot comprising a zoom start point and a zoom end point, wherein the indication of the zoom start and end points are received relative to an active unit of measure of the horizontal or vertical dimension of the active zoom plot;
when at least one inactive plot is to be synchronized, for each of the at least one inactive plot, determine if a preset transfer function is available to convert the active unit of measure to an inactive unit of measure of the horizontal or vertical dimension of the at least one inactive zoom plot;
when the preset transfer function is available, zoom an inactive plot of the at least one inactive plot by:
converting the zoom start point from the active unit of measure to an inactive zoom start point in the inactive unit of measure of the synchronized dimensions of the at least one inactive zoom plot using the preset transfer function; and
converting the zoom end point from the active unit of measure to an inactive zoom end point in the inactive unit of measure using the preset transfer function; and
when the preset transfer function is not available, do not zoom the inactive zoom plot.

10. The method of claim 9, comprising:
determining that the inactive zoom end point extends beyond an maximum value for the at least one inactive plot; and
providing an alert that indicates that the zoom extends beyond the at least one inactive plot.

11. The method of claim 10, wherein the alert comprises a visual alert configured to notify an operator that the zoom extends beyond the at least one inactive plot.

12. The method of claim 9, comprising:
determining that the inactive zoom start point extends beyond a minimum value for the at least one inactive plot; and
providing an alert that indicates that zoom extends beyond the at least one inactive plot.

13. The method of claim 12, wherein the alert comprises a visual alert configured to notify that the zoom extends beyond the at least one inactive plot.

14. A non-transitory, computer-readable medium having stored thereon instructions that, when executed, are configured to cause a processor to:
monitor operation of turbomachinery;
cause the display of a graphical visualization of a plurality of data plots, wherein the plurality of data plots each having a horizontal and vertical dimension, wherein the plurality of data plots comprises:
an active zoom plot related to operation of the turbomachinery, wherein the active zoom plot comprises an active unit of measure; and
an inactive zoom plot related to the operation of the turbomachinery, wherein the inactive zoom plot comprises an inactive unit of measure;
determine that the inactive zoom plot is to be synchronized with the active zoom plot in the horizontal or vertical dimension when zooming the active zoom plot;
receive an indication that the active zoom plot is to be zoomed to an active zoom area, wherein the active zoom area comprises a zoom start point and a zoom end point in the horizontal or vertical dimension;
zoom the active zoom plot based at least in part on the indication;
when the inactive zoom plot is to be synchronized, determine if a transfer function is available for converting at least one of the zoom start point and the zoom end point of the active zoom area from the active unit of measure to a corresponding value in the inactive zoom plot having the inactive unit of measure;
when the transfer function is a available, zoom the inactive zoom plot by rescaling the horizontal or vertical dimension by converting the zoom start point and the zoom end point from the active unit of measure to the corresponding inactive zoom start point and inactive zoom end point in the inactive zoom plot having the inactive unit of measure using the transfer function; and
when the transfer function is not available, do not zoom the inactive zoom plot.

15. The non-transitory, computer-readable medium of claim 14, wherein the instructions are configured to cause the processor to cause a display of the indication of the active zoom area on the active zoom plot using a solid line.

16. The non-transitory, computer-readable medium of claim 14, wherein the instructions are configured to cause the processor to cause a display of a inactive zoom area on the inactive zoom plot using a dashed line.

17. The non-transitory, computer-readable medium of claim 14, wherein the zooming comprises reverse zooming.

18. The non-transitory, computer-readable medium of claim 14, wherein a unit of measure of the zoom start point comprises revolutions and a unit of measure of the inactive zoom start point comprises a frequency.

* * * * *